United States Patent
Calciu et al.

(10) Patent No.: US 11,949,587 B2
(45) Date of Patent: Apr. 2, 2024

(54) SELF-CONFIGURING LINK AGGREGATION CONTROL PROTOCOL

(71) Applicant: Lenovo Global Technology (United States) Inc., Morrisville, NC (US)

(72) Inventors: Corneliu-ilie Calciu, Bucharest (RO); Radu Mihai Iorga, Bucharest (RO); George-Andrei Stanescu, Ilfov (RO); Bogdan-Cosmin Chifor, Nojorid (RO)

(73) Assignee: Lenovo Global Technology (United States) Inc., Morrisville, NC (US)

( * ) Notice: Subject to any disclaimer, the term of this patent is extended or adjusted under 35 U.S.C. 154(b) by 91 days.

(21) Appl. No.: 17/491,142

(22) Filed: Sep. 30, 2021

(65) Prior Publication Data

US 2023/0098049 A1 Mar. 30, 2023

(51) Int. Cl.
*H04L 45/24* (2022.01)
*H04L 41/0816* (2022.01)

(52) U.S. Cl.
CPC ........ *H04L 45/245* (2013.01); *H04L 41/0816* (2013.01)

(58) Field of Classification Search
None
See application file for complete search history.

(56) References Cited

U.S. PATENT DOCUMENTS

| | | | | |
|---|---|---|---|---|
| 10,693,813 | B1* | 6/2020 | Jacob Da Silva | H04L 12/4641 |
| 2009/0109998 | A1* | 4/2009 | Vinayagam | H04L 41/0886 370/465 |
| 2012/0182866 | A1* | 7/2012 | Vinayagam | H04L 49/552 370/256 |
| 2014/0189094 | A1* | 7/2014 | Ditya | H04L 45/245 709/224 |
| 2014/0372576 | A1* | 12/2014 | Mohandas | H04L 49/354 709/220 |
| 2015/0163100 | A1* | 6/2015 | Graf | H04L 43/12 370/255 |
| 2016/0373352 | A1* | 12/2016 | Sharma | H04L 45/64 |

* cited by examiner

*Primary Examiner* — Benjamin Lamont
(74) *Attorney, Agent, or Firm* — Kunzler Bean & Adamson; Bruce R. Needham

(57) ABSTRACT

A method includes receiving, at an unmanaged switch, a link-aggregation control protocol ("LACP") protocol data unit ("PDU") on each port of two or more connections to be in a link-aggregation group ("LAG"). The ports are in the unmanaged switch, which is unconfigured for LACP and is connected over the connections to a managed switch configured for LACP. The method includes, in response to the ports that received an LACP PDU being unconfigured for LACP, configuring each port receiving an LACP PDU for LACP, creating a LAG that includes the connections of the ports that received the LACP PDUs, and starting an LACP timer. The method includes, in response to determining that the LACP timer has expired, clearing the LACP configuration of the ports configured for LACP. The LACP timer expires in response to the ports in the LAG not receiving additional LACP PDUs prior to expiration of a timer period.

17 Claims, 6 Drawing Sheets

SELF-CONFIGURING LINK AGGREGATION CONTROL PROTOCOL

FIELD

The subject matter disclosed herein relates to link aggregation control protocol ("LACP") running on switches and more particularly relates to automatically configuring an unmanaged switch to run LACP.

BACKGROUND

While deploying new equipment like private cloud infrastructure in existing data centers, routers and switches from the aggregation layer typically must be reconfigured to accommodate new topology. Typically, a complex data network configuration is required in a data center to provide resiliency and security for the customer packets. However, a typical management network only carries the traffic of the infrastructure and includes a low function, in expensive switch which doesn't typically support LACP and link aggregation groups ("LAGs"). This switch limits the management network to a single connection to a switch connected to a system administrator computer, which reduces redundancy and reliability. Other switches connected to managed switches are unmanaged because they are controlled by another entity so that running LACP to establish a LAG is not possible through traditional means.

BRIEF SUMMARY

A method for a self-configuring LACP in an unmanaged switch is disclosed. An apparatus and computer program product also perform the functions of the method. The method includes receiving, at an unmanaged switch, an LACP protocol data unit ("PDU") on each port of two or more connections to be linked in a LAG. The ports of the two or more connections are in the unmanaged switch and the unmanaged switch is unconfigured for LACP and is connected over the two or more connections to a managed switch configured for LACP. The method includes, in response to determining that the ports that received an LACP PDU are unconfigured for LACP, configuring each port receiving an LACP PDU for LACP, creating a LAG that includes the two or more connections to the managed switch connected to the ports that received the LACP PDUs, and starting an LACP timer. The method includes, in response to determining that the LACP timer has expired, clearing the LACP configuration of the ports configured for LACP. The LACP timer expires in response to the ports in the LAG not receiving additional LACP PDUs prior to expiration of an LACP timer period.

An apparatus for a self-configuring LACP in an unmanaged switch includes a controller of an unmanaged switch and a memory storing code. The code is executable by the controller to perform operations comprising receiving, at the unmanaged switch, a LACP PDU on each port of two or more connections to be linked in a LAG. The ports of the two or more connections are in the unmanaged switch and the unmanaged switch is unconfigured for LACP and is connected over the two or more connections to a managed switch configured for LACP. The operations further include, in response to determining that the ports that received an LACP PDU are unconfigured for LACP, configuring each port receiving an LACP PDU for LACP, creating a LAG that includes the two or more connections to the managed switch connected to the ports that received the LACP PDUs, and starting an LACP timer. The operations include, in response to determining that the LACP timer has expired, clearing the LACP configuration of the ports configured for LACP. The LACP timer expires in response to the ports in the LAG not receiving additional LACP PDUs prior to expiration of an LACP timer period.

A program product for a self-configuring LACP in an unmanaged switch includes a non-volatile computer readable storage medium and non-volatile program code embodied therein. The program code is configured to be executable by a processor of an unmanaged switch to perform operations that include receiving, at an unmanaged switch, a LACP PDU on each port of two or more connections to be linked in a LAG. The ports of the two or more connections are in the unmanaged switch. The unmanaged switch is unconfigured for LACP and is connected over the two or more connections to a managed switch configured for LACP. The program code is executable by the processor to perform operations that include, in response to determining that the ports that received an LACP PDU are unconfigured for LACP, configuring each port receiving an LACP PDU for LACP, creating a LAG that includes the two or more connections to the managed switch connected to the ports that received the LACP PDUs, and starting an LACP timer. The program code is executable by the processor to perform operations that include, in response to determining that the LACP timer has expired, clearing the LACP configuration of the ports configured for LACP. The LACP timer expires in response to the ports in the LAG not receiving additional LACP PDUs prior to expiration of an LACP timer period.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
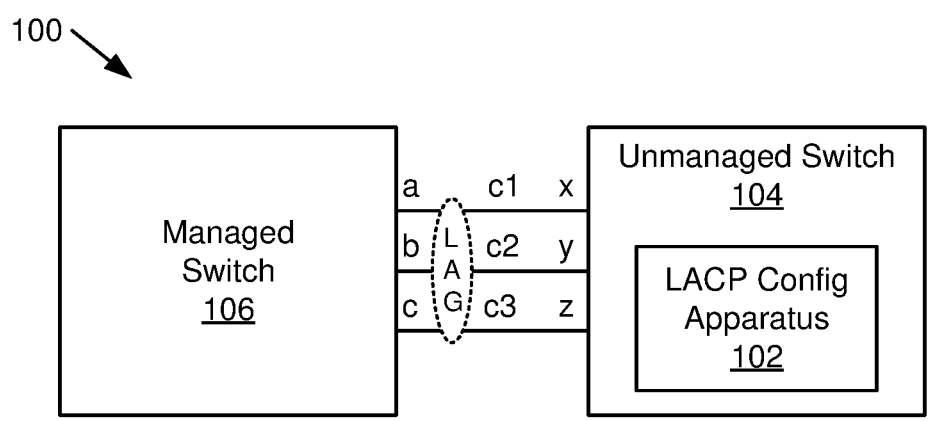
FIG. 1 is a schematic block diagram illustrating one embodiment of a managed switch and unmanaged switch for self-configuring link aggregation control protocol.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code or program code. The storage devices may be tangible, non-transitory, and/or non-transmission. The storage devices ae non-transitory and do not embody signals when storing code.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in code and/or software for execution by various types of processors or controllers of an unmanaged switch. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across one or more memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store program code for use by or in connection with an instruction execution system, apparatus, or device where the storage device stores program code to be transferred to an unmanaged switch.

Code for carrying out operations for embodiments may be written in any combination of one or more programming languages including an object oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on an unmanaged switch, partly on the unmanaged switch, or as a stand-alone software package to be loaded on an unmanaged switch. A remote computer comprising program code for embodiments described herein may be connected to the unmanaged switch through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of an unmanaged switch, special purpose computer of an unmanaged switch, a controller of an unmanaged switch, or other programmable data processing apparatus to produce a machine, such that the instructions, which execute via the processor/controller of the unmanaged switch or other programmable data processing apparatus, create means for implementing the functions/acts specified in the schematic flowchart diagrams and/or schematic block diagrams block or blocks.

The code may also be stored in a storage device that can direct an unmanaged switch, other programmable data processing apparatus of the unmanaged switch, or other devices to function in a particular manner, such that the instructions stored in the storage device produce an article of manufacture including instructions which implement the function/act specified in the schematic flowchart diagrams and/or schematic block diagrams block or blocks.

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C.

A method for a self-configuring LACP in an unmanaged switch is disclosed. An apparatus and computer program product also perform the functions of the method. The method includes receiving, at an unmanaged switch, an LACP protocol data unit ("PDU") on each port of two or more connections to be linked in a LAG. The ports of the two or more connections are in the unmanaged switch and the unmanaged switch is unconfigured for LACP and is connected over the two or more connections to a managed switch configured for LACP. The method includes, in response to determining that the ports that received an LACP PDU are unconfigured for LACP, configuring each port receiving an LACP PDU for LACP, creating a LAG that includes the two or more connections to the managed switch connected to the ports that received the LACP PDUs, and starting an LACP timer. The method includes, in response to determining that the LACP timer has expired, clearing the LACP configuration of the ports configured for LACP. The LACP timer expires in response to the ports in the LAG not receiving additional LACP PDUs prior to expiration of an LACP timer period.

In some embodiments, the received LACP PDUs include identification information for the managed switch and the method includes, in response to determining that the ports that received an LACP PDU are configured for LACP, determining if identification information in additional LACP PDUs received over the two or more connections configured in the LAG match identification information for the managed switch. In the embodiment, the method includes, in response to determining that the identification information in the received additional LACP PDUs matches identification information of the managed switch, restarting the LACP timer, and in response to determining that the identification information in the received additional LACP PDUs do not match identification information of the managed switch, stopping the LACP timer and clearing the LACP configuration of the ports configured for LACP.

In further embodiments, the method includes, in response to determining that the ports that received an LACP PDU are unconfigured for LACP, allocating an admin key to the ports configured in the LAG and transmitting the admin key to the managed switch. The managed switch transmits the admin key in additional LACP PDUs transmitted from the managed switch on the two or more connections of the LAG. In the embodiments, in response to determining that an admin key in the received additional LACP PDUs does not match the admin key allocated to the ports configured in the LAG, the method includes stopping the LACP timer and clearing the LACP configuration of the ports configured for LACP. In the embodiments, in response determining that the identification information in the received additional LACP PDUs matches identification information of the managed switch and determining that an admin key in the received additional LACP PDUs matches the admin key allocated to the ports configured in the LAG, the method includes restarting the LACP timer.

In some embodiments, the LAG is a multi-chassis link aggregation group ("MLAG"). In other embodiments, the unmanaged switch lacks a capability to manually configure ports for LACP. In other embodiments, the unmanaged switch includes a connection to a baseboard management controller of each of two or more computing devices and the managed switch includes a cloud controller. In other embodiments, an organization controlling the managed switch lacks permission to configure ports of the unmanaged switch. In other embodiments, the LACP timer period is greater than an interval that the managed switch transmits LACP PDUs to the ports on the unmanaged switch of the two or more connections to the managed switch. In other embodiments, steps of the method are executed within the unmanaged switch.

An apparatus for a self-configuring LACP in an unmanaged switch includes a controller of an unmanaged switch and a memory storing code. The code is executable by the controller to perform operations comprising receiving, at the unmanaged switch, a LACP PDU on each port of two or more connections to be linked in a LAG. The ports of the two or more connections are in the unmanaged switch and the unmanaged switch is unconfigured for LACP and is connected over the two or more connections to a managed switch configured for LACP. The operations further include, in response to determining that the ports that received an LACP PDU are unconfigured for LACP, configuring each port receiving an LACP PDU for LACP, creating a LAG that includes the two or more connections to the managed switch connected to the ports that received the LACP PDUs, and starting an LACP timer. The operations include, in response to determining that the LACP timer has expired, clearing the LACP configuration of the ports configured for LACP. The LACP timer expires in response to the ports in the LAG not receiving additional LACP PDUs prior to expiration of an LACP timer period.

In some embodiments, the received LACP PDUs include identification information for the managed switch and the operations further include, in response to determining that the ports that received an LACP PDU are configured for LACP, determining if identification information in additional LACP PDUs received over the two or more connections configured in the LAG match identification information for the managed switch. In the embodiments, the operations further include, in response to determining that the identification information in the received additional LACP PDUs match identification information of the managed switch, restarting the LACP timer, and in response to determining that the identification information in the received additional LACP PDUs do not match identification information of the managed switch, stopping the LACP timer and clearing the LACP configuration of the ports configured for LACP.

In further embodiments, the operations include, in response to determining that the ports that received an LACP PDU are unconfigured for LACP, allocating an admin key to the ports configured in the LAG and transmit the admin key to the managed switch. The managed switch transmits the admin key in additional LACP PDUs transmitted from the managed switch on the two or more connections of the LAG. In the embodiments, in response to determining that an admin key in the received additional LACP PDUs does not match the admin key allocated to the ports configured in the LAG, the operations include stopping the LACP timer and clearing the LACP configuration of the ports configured for LACP.

In some embodiments, the LAG is an MLAG. In other embodiments, the unmanaged switch lacks a capability to manually configure ports for LACP. In other embodiments, the unmanaged switch includes a connection to a baseboard management controller of each of two or more computing devices and the managed switch includes a cloud controller. In other embodiments, an organization controlling the managed switch lacks permission to configure ports of the unmanaged switch. In other embodiments, the LACP timer period is greater than an interval that the managed switch transmits LACP PDUs to the ports on the unmanaged switch of the two or more connections to the managed switch.

A program product for a self-configuring LACP in an unmanaged switch includes a non-volatile computer readable storage medium and non-volatile program code embodied therein. The program code is configured to be executable by a processor of an unmanaged switch to perform operations that include receiving, at an unmanaged switch, a LACP PDU on each port of two or more connections to be linked in a LAG. The ports of the two or more connections are in the unmanaged switch. The unmanaged switch is unconfigured for LACP and is connected over the two or more connections to a managed switch configured for LACP. The program code is executable by the processor to perform operations that include, in response to determining that the ports that received an LACP PDU are unconfigured for LACP, configuring each port receiving an LACP PDU for LACP, creating a LAG that includes the two or more connections to the managed switch connected to the ports that received the LACP PDUs, and starting an LACP timer. The program code is executable by the processor to perform operations that include, in response to determining that the LACP timer has expired, clearing the LACP configuration of the ports configured for LACP. The LACP timer expires in response to the ports in the LAG not receiving additional LACP PDUs prior to expiration of an LACP timer period.

In some embodiments, the received LACP PDUs include identification information for the managed switch and the operations further include, in response to determining that the ports that received an LACP PDU are configured for LACP, determining if identification information in additional LACP PDUs received over the two or more connections configured in the LAG match identification information for the managed switch, in response to determining that the identification information in the received additional LACP PDUs match identification information of the managed switch, restarting the LACP timer, and in response to determining that the identification information in the received additional LACP PDUs do not match identification information of the managed switch, stopping the LACP timer and clearing the LACP configuration of the ports configured for LACP.

In further embodiments, the operations further include, in response to determining that the ports that received an LACP PDU are unconfigured for LACP, allocating an admin key to the ports configured in the LAG and transmitting the admin key to the managed switch, where the managed switch transmits the admin key in additional LACP PDUs transmitted from the managed switch on the two or more connections of the LAG, and in response to determining that an admin key in the received additional LACP PDUs does not match the admin key allocated to the ports configured in the LAG, stopping the LACP timer and clearing the LACP configuration of the ports configured for LACP.

FIG. 1 is a schematic block diagram illustrating one embodiment 100 of a managed switch 106 and unmanaged switch 104 for self-configuring LACP. The embodiment 100 includes an LACP configuration apparatus 102 in an unmanaged switch 104 connected to a managed switch 106. The managed switch 106 is connected to an unmanaged switch 104 with three connections c1, c2 and c3. Connections c1, c2 and c3 are connected from ports a, b, and c on the managed switch 106 to ports x, y and z respectively on the unmanaged switch 104. While three network connections c1, c2 and c3 are shown between the managed switch 106 and the unmanaged switch 104, any number of network connections may exist between the switches 104, 106 as long as there are at least two network connections.

The managed switch 106 is configured to support LACP, which allows some or all of the connections between the managed switch 106 and another switch to be combined into a LAG or an MLAG if the managed switch is paired with another switch, as will be explained further for the system 200 of FIG. 2. A LAG provides a mechanism for combining (e.g. aggregating) multiple network connections in parallel. A LAG may be treated as a single logical connection where LACP provides a mechanism to control which of the network connections in a LAG will be used for a transmission of a particular data packet. LACP manages sharing between the network connections of a LAG. LACP provides a way to increase throughput beyond what a single connection could maintain. A LAG also provides redundancy in case of failure of one or more of the connections of the LAG. In some embodiments, LACP for Ethernet is defined in IEEE 802.1AX, or previously by IEEE 802.3ad.

When operating, the LACP of a switch with network connections configured in a LAG will spontaneously transmit LACP protocol data units ("PDUs") at a set interval where the LACP is in an active mode. The LACP PDUs are packets dedicated to LACP management and typically each include an identification of the sending switch, such as a media access control ("MAC") address, a port ID from which the LACP PDU was sent, and a timeout value. In some embodiments, the timeout value is an interval that the LACP sends LACP PDUs. In another embodiment, the timeout value is for a timer and is longer than an interval that the LACP sends LACP PDUs. The LACP of a switch with connections configured in a LAG sends LACP PDUs from each port in the LAG.

When a managed switch runs LACP, a system administrator manually configures a LAG through commands to the LACP. Where both switches with network connections between them are managed switches that run LACP and allow configuration of the LACP, setting up a LAG requires the LACP in both switches to be manually configured and the LACP on at least one managed switch to be set to active. For example, if the LACP in only one switch groups connections in a LAG and the LACP in the other switch is not manually configured to have the same LAG then the LAG is not set up. Where the other switch is a managed switch running LACP but does not have connections configured in a LAG, any received LACP PDUs are ignored.

Where a managed switch 106 is connected to an unmanaged switch 104, configuring the LACP of the managed switch 106 with a LAG does not typically configure a LAG because either the unmanaged switch 104 does not have a capability to have LACP running or a system administrator having control over the managed switch 106 does not have permission or the ability to configure the LACP running on the unmanaged switch 106. For example, the unmanaged switch 106 may be owned by another entity, such as an internet service provider ("ISP"). The ISP may have a switch that is connected to the managed switch 106, but the ISP may not allow access to the switch so it is an unmanaged switch 104. Some switches do not have the ability to run LACP, and are lower functioning to save money, as will be explained further for the system 200 of FIG. 2.

Providing the LACP configuration apparatus 102 provides an ability to automatically set up a LAG on the unmanaged switch 104. For example, low-functioning switches often have an ability to run a small section of code so that the LACP configuration apparatus 102 can be installed on the unmanaged switch 104. The LACP configuration apparatus 102 uses received LACP PDUs to configure an LAG for two or more of the connections between the managed switch 106 and the unmanaged switch 104 and then runs a timer that is reset each time LACP PDUs are received. If the LACP configuration apparatus 102 does not receive LACP PDUs on the connections in the LAG before a timeout, the LACP configuration apparatus 102 clears the LAG until further LACP PDUs are received, which are then used to reestablish the LAG. The LACP configuration apparatus 102 is described further in relation to the apparatuses 300 of FIGS. 3 and 4.

Typically, the connections c1, c2, c3 are Ethernet connections. The managed switch 106 and the unmanaged switch 104 may be any type of switch that supports LACP. While only connections c1, c2, c3 are shown for simplicity between the managed switch 106 and the unmanaged switch 104, the unmanaged switch 104 and the managed switch 106 include other connections to other devices, such as to a client, a server, a data storage device, another switch, or any other computing device capable of a data connection.

Figure 2:
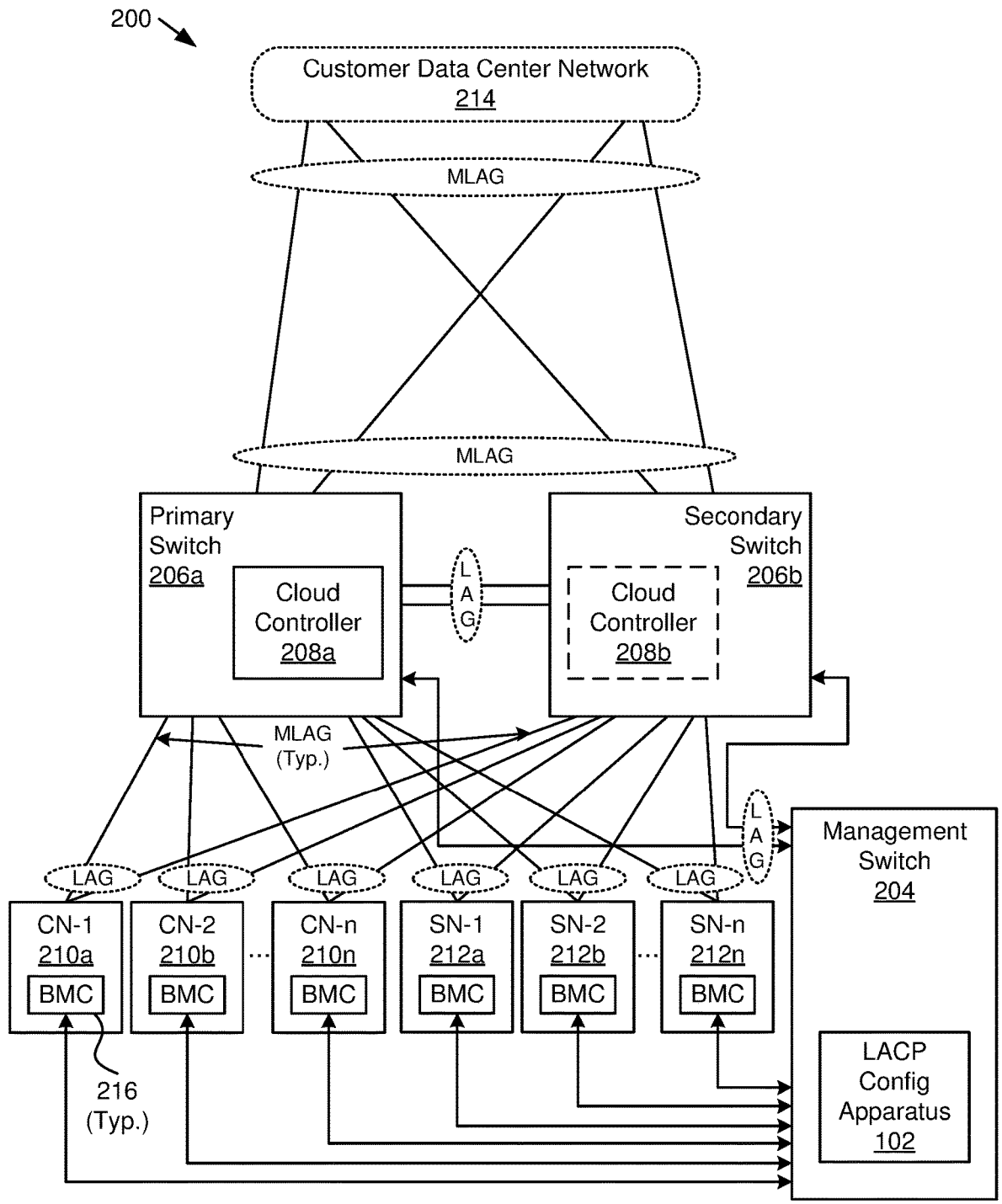
FIG. 2 is a schematic block diagram illustrating one embodiment of a computing system with a primary and secondary switch that are managed and a management switch that is an unmanaged switch for self-configuring link aggregation control protocol.

FIG. 2 is a schematic block diagram illustrating one embodiment of a computing system 200 with a primary switch 206a and secondary switch 206b that are managed and a management switch 204 that is an unmanaged switch for self-configuring link aggregation control protocol. The system 200 includes another embodiment of an LACP Configuration apparatus 102 in the management switch 204, a primary switch 206a with a cloud controller 208a, a secondary switch 206b with a backup cloud controller 208b, compute nodes CN-1 to CN-n 210a-n (generically or collectively "210"), storage devices SN-1 to SN-n 212a-n (generically or collectively "212") and a customer data center network 214, which are described below.

The LACP configuration apparatus 102 is substantially similar to the LACP configuration apparatus 102 of the embodiment 100 of FIG. 1. In the system 200, the primary switch 206a and the secondary switch 206b are managed switches capable of running LACP and are connected to the management switch 204 with an MLAG because a network connection from the primary switch 206a to the management switch 204 and from the secondary switch 206b to the management switch 204 are in the MLAG are split between the two switches 206a, 206b. In other designs, management switches 204 have only a single connection to the primary switch 206a because often management switches 204 are unmanaged switches in that the management switches are not capable of running LACP. Embodiments described herein include an LACP configuration apparatus 102 in the management switch 204 so that the connections to the primary and secondary switches 206a, 206b can be combined in an MLAG.

The management switch 204 is connected to a baseboard management controller ("BMC") 216 in each compute node 210 and each storage device 212 and possibly to other equipment in the system 200 (not shown). A BMC 216 is provided in the compute nodes 210, storage devices 212 and other devices typically for management functions. A BMC 216 may provide access, for example to a compute node 210, when the compute node 210 is running or not running. For example, the BMC 216 may be used to install firmware on the compute nodes 210 and storage devices 212. In some embodiments, the BMCs 216 are referred to as service processors. The BMC 216 is typically small and may be a system on a chip solution. The BMC 216 may also be used for management and monitoring of other physical devices of the compute nodes 210, storage devices 212, etc., such as for fans, power supplies, etc. and for other telemetry functions, such as temperature monitoring. In one embodiment, the BMC 216 is an XClarity® Controller ("XCC") by Lenovo®. In other embodiments, the BMC 216 is an Integrated Management Module ("IMM") by IBM®. One of skill in the art will recognize other forms of a BMC 216 that may be used with the embodiments described herein.

The management switch 204 is connected to the primary switch 206a, which then connects to a computing device of a system administrator to allow access to the system administrator for management functions. In some embodiments, the system administrator accesses the BMCs 216 through the cloud controller 208a in the primary switch 206a. When the primary switch 206a goes down, in the embodiments depicted herein, the connection between the management switch 204 and the secondary switch 206b provides a backup connection to allow the system administrator continued access to the BMCs 216.

The management switch 204 is often an inexpensive device because accessing the BMCs 216 for management functions is infrequent compared to normal data traffic from the customer data center network 214 to the compute nodes 210 and storage devices 212. Typically, the amount of data traffic through the management switch 204 does not justify an expensive switch so management switches, such as the management switch 204 of the system 200 of FIG. 2, are not capable of running LACP. While the management switch 204 is typically under control of the system administrator for the system 200, the management switch 204 is considered to be an unmanaged switch because of a lack of ability to manage an LACP running on the management switch 204. As used herein, an unmanaged switch is a switch where a LAG or MLAG cannot be set up because of a lack of ability to manually configure an LACP to set up the LAG or MLAG.

The compute nodes 210 are typically rack-mounted servers used to run workloads for clients and are accessed from the customer data center network 214. Typically, compute nodes 210 maintain security by running workloads in virtual machines, containers or the like. The compute nodes 210, in other embodiments, may be other computing devices, such as workstations, desktop computers, a mainframe computer, or other computing device with a BMC 216. The storage devices 212 include non-volatile data storage and may be part of a storage area network ("SAN"). The storage devices 212 include a BMC 216 and are accessible by the compute nodes 210 for data storage. In some embodiments, the storage devices 212 are storage controllers that access and manage physical storage devices, such as hard disk drives, solid-state storage, etc. The storage devices 212 may also be accessed by devices through the customer data center network 214.

The primary and secondary switches 206a, 206b are connected where the connections are grouped in a LAG and operate typically so that if the primary switch 206a goes down then the secondary switch 206b provides redundancy. Thus, the compute nodes 210, storage devices 212 and customer data center network 214 include a connection to each of the primary and secondary switches 206a, 206b. Having a connection from the management switch 204 to both the primary and secondary switches 206a, 206b increases reliability. If the connections between the management switch 204 and the primary and secondary switches 206a, 206b were not grouped in a LAG, the configuration would create a loop and would be problematic.

The cloud controller 208a in the primary switch 206a is beneficial to allow external management of the system 200. The cloud controller 208a in the primary switch 206a is used unless the primary switch 206a is unavailable. The cloud controller 208b in the secondary switch provides a backup when the cloud controller 208a in the primary switch 206a is unavailable.

The customer data center network 214 includes clients, servers, and/or other computing devices that have access to the compute nodes 210 and storage devices 212. Typically, devices in in the customer data center network 214 submit workloads to the compute nodes 210 and may also have access to data on the storage devices 212. The system 200 of FIG. 2 is merely an example where managed switches, here in the form of a primary switch 206a and a secondary switch 206b, are connected to an unmanaged switch 104, here in the form of the management switch 204. The embodiments described herein are applicable to any system with one or more managed switches connected to an unmanaged switch 104 that may benefit from having an ability to have a LAG set up on the unmanaged switch 104 for the connections to the managed switch(es).

Figure 3:
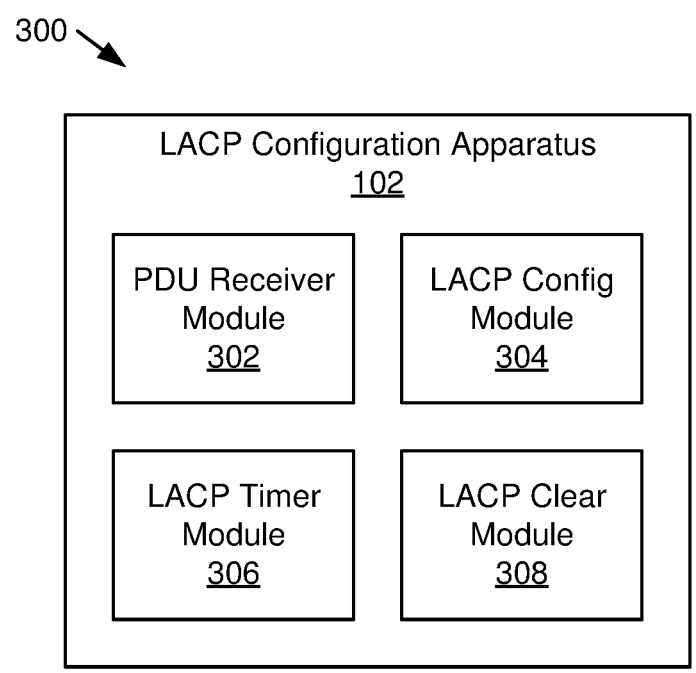
FIG. 3 is a schematic block diagram illustrating one embodiment of an apparatus for self-configuring link aggregation control protocol.

FIG. 3 is a schematic block diagram illustrating one embodiment of an apparatus 300 for self-configuring link aggregation control protocol. The apparatus 300 includes an embodiment of the LACP configuration apparatus 102 with a PDU receiver module 302, an LACP configuration module 304, an LACP timer module 306 and an LACP clear module 308, which are described below. In some embodiments, the apparatus 300 is implemented with program code uploaded to non-volatile memory of an unmanaged switch 104 where the program code is executable on a processor or controller of the unmanaged switch 104. In other embodiments, the apparatus 300 is implemented with an FPGA of the unmanaged switch 104. In other embodiments, all or part of the apparatus 300 is implemented with hardware circuits. For example, the apparatus 300 may integrate and/or control switching application specific integrated circuits ("ASICs") of the unmanaged switch 104.

The apparatus 300 includes a PDU receiver module 302 configured to receive, at an unmanaged switch 104, an LACP PDU on each port of two or more connections to be linked in a LAG or an MLAG. The ports of the two or more connections are in the unmanaged switch 104. The unmanaged switch 104 is initially unconfigured for LACP and is connected over the two or more connections to a managed switch 106 configured for LACP. Where the managed switch 106 has been programmed for a particular LAG, the managed switch 106 will send LACP PDUs to the unmanaged switch 104 on each of the connections in the LAG.

For example, if there are three connections (e.g. c1, c2, c3) between the unmanaged switch 104 and the managed switch 106 and all three connections c1, c2, c3 are to be in a LAG, the managed switch 106 will send LACP PDUs on each of the three connections on a periodic basis if the managed switch 106 has an LACP programed with the three connections c1, c2, c3 in the LAG and the LACP is in an active mode. If only two of the three connections (e.g. c1, c2) are to be in the LAG, the managed switch 106 will send LACP PDUs on just the two connections c1, c2.

Each LACP PDU includes limited information, such as a MAC address of the managed switch 106, a port number from which the LACP PDU was sent, and possibly a timeout value. The timeout value establishes, in some embodiments, a frequency of when the managed switch 106 will be sending LACP PDUs. The PDU receiver module 302 receives the LACP PDUs from each port of the LAG, which is enough information to set up a LAG on the unmanaged switch 104. In addition, information from the LACP PDUs, in some embodiments, is used to set up a timeout period for the LAG on the unmanaged switch 104. For example, a timeout period sent in the LACP PDUs may be used to set up the timeout period.

The apparatus 300 includes an LACP configuration module 304 and an LACP timer module 306. The LACP configuration module 304 is configured to determine if the ports that received an LACP PDU are configured or unconfigured for LACP. In response to the LACP configuration module 304 determining that the ports that received an LACP PDU are unconfigured for LACP, the LACP configuration module 304 is configured to configure each port receiving an LACP PDU for LACP and to create a LAG that includes the two or more connections to the managed switch 106 connected to the ports that received the LACP PDUs, and the LACP timer module 306 starts an LACP timer.

When LACP PDUs are received by the PDU receiver module 302 and no LAG is set up, the LACP configuration module 304 configures the ports that received the LACP PDUs with LACP and groups the ports in a LAG so that when packets are received by the unmanaged switch 104 to be sent to the managed switch 106, the LACP will decide which port of the LAG to send the packets. For example, the LACP on the unmanaged switch 104 may alternate which port sends the packets. In other embodiments, the LACP on the unmanaged switch 104 may manage packet distribution based on utilization of the queues of the ports of the LAG. In some embodiments, the LACP configuration module 304 groups the ports of the LAG with a virtual port identifier so that devices sending packets to the unmanaged switch 104 intended for the managed switch 106 use the virtual port identifier. In some embodiments, the LACP configuration module 304 installs program code on the unmanaged switch 104 to run LACP or at least one or more functions that manage packet distribution on the ports of the LAG.

Also when LACP PDUs are received by the PDU receiver module 302 and no LAG is set up, after the LACP configuration module 304 sets up the LAG, the LACP timer module 306 starts an LACP timer. The LACP timer is a mechanism to allow clearing of the LAG setup if LACP PDUs are not received from the LACP of the managed switch 106 in a specified amount of time, which typically signifies that the LAG has been removed. While a LAG on the managed switch 106 is in place, the LACP of the managed switch 106 that is set to active mode sends LACP PDUs on a regular basis. The LACP timer is typically set to an amount of time longer than an interval that the LACP of the managed switch 106 sends LACP PDUs. In some embodiments, the LACP timer is set to a value that is more than one time interval for sending LACP PDUs or a multiple of the time interval. For example, if the LACP on the managed switch 106 sends LACP PDUs every 30 seconds, the LACP timer might be set to some value longer than 30 seconds, such as 2 minutes where 2 minutes is 4 times the time interval for sending LACP PDUs. One of skill in the art will recognize an appropriate time value for the LACP timer.

The apparatus 300 includes an LACP clear module 308 configured to, in response to determining that the LACP timer has expired, clear the LACP configuration of the ports configured for LACP. The LACP timer expires in response to the ports in the LAG not receiving additional LACP PDUs prior to expiration of an LACP timer period. For example, where the LACP on the managed switch 106 no longer sends LACP PDUs, the LACP timer will continue to run and will expire. The LACP clear module 308 on the managed switch 106 then clears the LACP configuration of the ports of the LAG on the unmanaged switch 104. The ports of the unmanaged switch 104 that were in the LAG then operate independently instead of in a LAG. The LACP clear module 308 may clear the LACP configuration, in one embodiment, by returning the ports to a default condition. One of skill in the art will recognize other ways for the LACP clear module 308 to clear the LACP configurations and/or the LAG of the ports of the unmanaged switch 104.

Figure 4:
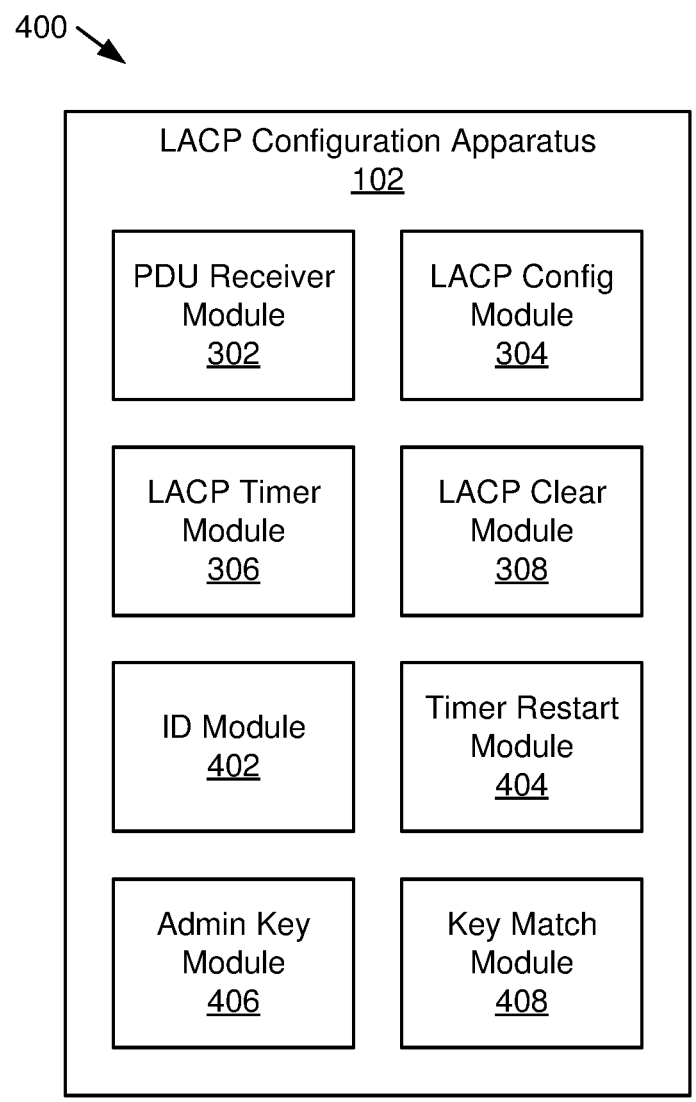
FIG. 4 is a schematic block diagram illustrating another embodiment of an apparatus for self-configuring link aggregation control protocol.

FIG. 4 is a schematic block diagram illustrating another embodiment of an apparatus 400 for self-configuring link aggregation control protocol. The apparatus 400 includes another embodiment of the LACP configuration apparatus 102 that includes a PDU receiver module 302, an LACP configuration module 304, an LACP timer module 306 and an LACP clear module 308, which are substantially similar to those described in relation to the apparatus 300 of FIG. 3. The LACP configuration module 102 also includes one or more of an ID module 402, a timer restart module 404, an admin key module 406 and/or a key match module 408, which are described below.

Typically, the LACP PDUs include identification information for the managed switch 106. For example, the LACP PDUs may include a MAC address of the managed switch 106 or some other identifier known to the unmanaged switch 104. The apparatus 400 includes, in some embodiments, an ID module 402 configured to, in response to determining that the ports that received an LACP PDU are configured for LACP, determine if identification information in additional LACP PDUs received over the two or more connections configured in the LAG match identification information for the managed switch 106. For example, the PDU receiver module 302 may receive LACP PDUs that are used to configure the ports from which the LACP PDUs are received with a LAG and then the PDU receiver module 302 may then receive additional LACP PDUs and the ID module 402 may then determine that the additional LACP PDUs are from the managed switch 106 based on an identifier in the LACP PDUs. Note that the ID module 402, in other embodiments, may also determine that LACP PDUs first received by the PDU receiver module 302 are from the managed switch 106 from the identifier in the LACP PDUs.

The apparatus 400, in some embodiments, includes a timer restart module 404 configured to, in response to the ID module 402 determining that the identification information in the received additional LACP PDUs match identification information of the managed switch 106, restart the LACP timer. Thus, when the LACP on the managed switch 106 continues to send LACP PDUs to the unmanaged switch 104, the timer restart module 404 restarts the LACP timer so that the LACP timer does not reach the expiration of the LACP timer period and the LACP clear module 308 would not clear the LACP configuration of the ports in the LAG on the unmanaged switch 104. If the ID module determines that the identification information in the received additional LACP PDUs does not match identification information of the managed switch 106, in some embodiments the LACP clear module 308 stops the LACP timer and clears the LACP configuration of the ports of the LAG configured for LACP. In other embodiments, if the ID module determines that the identification information in the received additional LACP PDUs does not match identification information of the managed switch 106, the timer restart module 404 does not restart the LACP timer but instead allows the LACP timer to continue to run.

The apparatus 400, in some embodiments, includes an admin key module 406 and a key match module 408. In response to the LACP configuration module 304 determining that the ports that received an LACP PDU are unconfigured for LACP, the admin key module 406 is configured to allocate an admin key to the ports configured in the LAG and to transmit the admin key to the managed switch 106. The managed switch 106 then transmits the admin key in additional LACP PDUs transmitted from the managed switch 106 on the two or more connections of the LAG. The admin key module 406 allocating an admin key provides additional security when transmitting LACP PDUs. After configuration of the LACP and the LAG on the unmanaged switch 104, the admin key module 406 transmitting an admin key to the managed switch 106 to be added to subsequent LACP PDUs provides a way to verify that the received LACP PDUs are from the managed switch 106 and not another source. In some embodiments, the admin key is part of a cryptographic security system for LACP PDUs.

The apparatus 400 includes a key match module 408 configured to determine if an admin key in additional LACP PDUs received by the PDU receiver module 302 matches the admin key allocated to the ports configured in the LAG. If the key match module 408 determines that the admin key in additional LACP PDUs received by the PDU receiver module 302 does not match the admin key allocated to the ports configured in the LAG of the unmanaged switch 104, the LACP clear module 308 stops the LACP timer and clears the LACP configuration on the ports in the LAG configured for LACP. In some embodiments, if the ID module 402 determines that the identification information in the received additional LACP PDUs does not match identification information of the managed switch 106 or the key match module 408 determines that the admin key in additional LACP PDUs received by the PDU receiver module 302 does not match the admin key allocated to the ports configured in the LAG of the unmanaged switch 104, the LACP clear module 308 stops the LACP timer and clears the LACP configuration on the ports in the LAG configured for LACP.

In some embodiments, the LACP clear module 308 stops the LACP timer and clears the LACP configuration on the ports in the LAG configured for LACP when only a portion of the ports of the LAG receive LACP PDUs. In the embodiment, the timer restart module 404 only restarts the LACP timer when all of the ports of the LAG receive LACP PDUs. Also, the ID module 402 determines that the identification information in the received additional LACP PDUs does not match identification information of the managed switch 106 if some of the ports of the LAG receive an LACP PDU with identification information that does not match identification information of the managed switch 106. Also, the key match module 408 determines that the admin key in additional LACP PDUs received by the PDU receiver module 302 does not match the admin key allocated to the ports configured in the LAG of the unmanaged switch 104 if some of the ports of the LAG receive an LACP PDU without an admin key or with an admin key that does not match the admin key allocated to the ports of the LAG.

Beneficially, the LACP configuration apparatus 102 provides a way to configure an unmanaged switch 104 to run LACP and to establish a LAG by automatically configuring the unmanaged switch 104 for LACP and by setting up a LAG on ports that receive LACP PDUs. Thus, a managed switch 106 connected to the unmanaged switch 104 can be configured for a LAG for connections between the managed switch 106 connected and the unmanaged switch 104 and can merely send LACP PDUs on the ports to be configured in the LAG to configure LACP and set up a LAG on the unmanaged switch 104. A managed switch 106 sending LACP PDUs after being configured is typical of how current managed switches running LACP operate. In response to receiving the LACP PDUs, the unmanaged switch 104 automatically sets up the LAG within the unmanaged switch 104 for the ports receiving the LACP PDUs.

Figure 5:
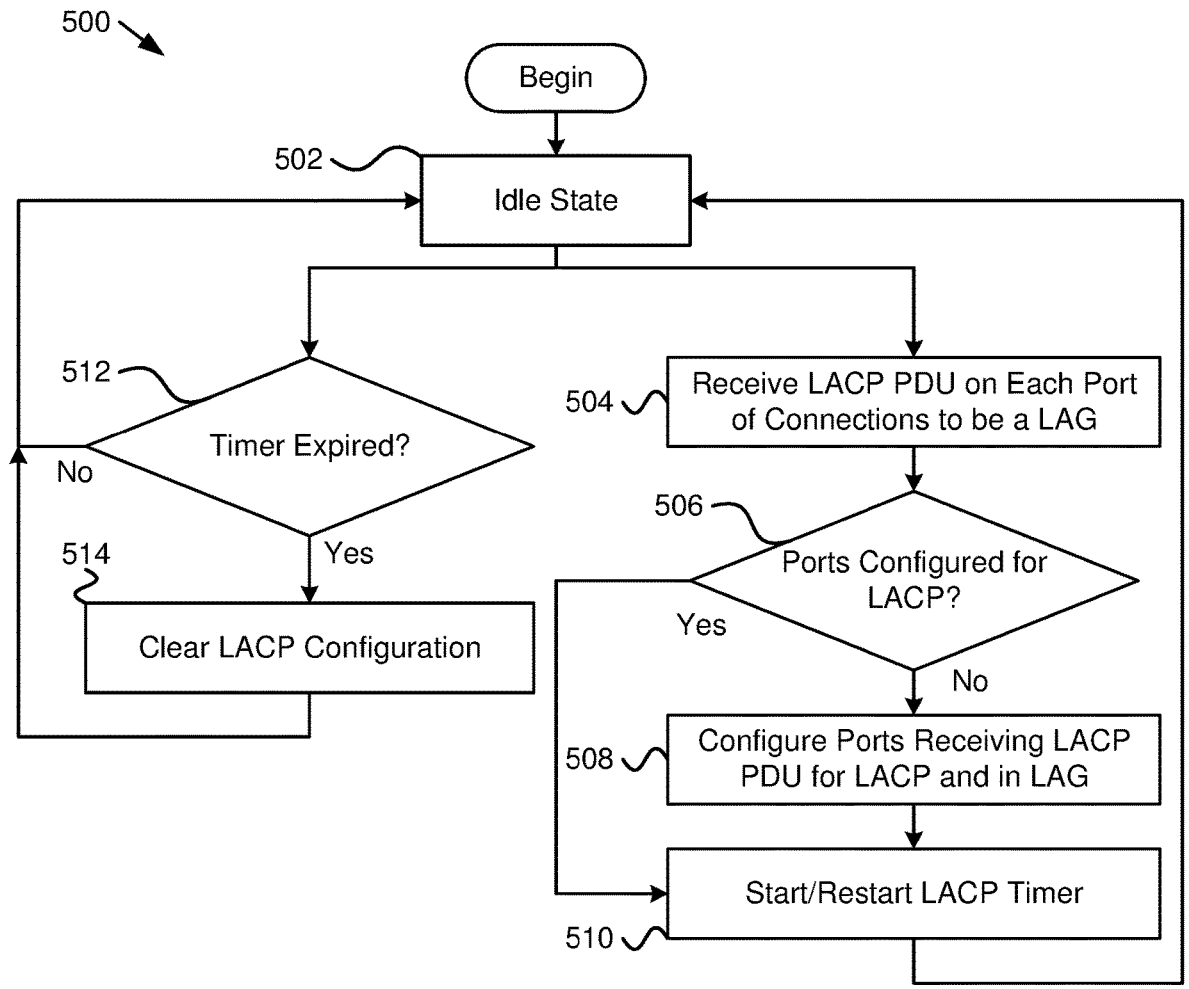
FIG. 5 is a schematic flow chart diagram illustrating one embodiment of a method for self-configuring link aggregation control protocol.

FIG. 5 is a schematic flow chart diagram illustrating one embodiment of a method 500 for self-configuring link aggregation control protocol. The method 500 runs on an unmanaged switch (e.g. 104) connected to a managed switch (e.g. 106) and begins in an idle state 502. From the idle state 502, the method 500 receives 504 an LACP PDU on each port of two or more connections to be linked in a LAG. The ports of the two or more connections are in the unmanaged switch 104 and are connected over the two or more connections to a managed switch 106. The method 500 determines 506 if the ports that received LACP PDUs are configured for LACP. If the method 500 determines 506 that the ports that received LACP PDUs are not configured for LACP, the method 500 configures 508 each port receiving an LACP PDU for LACP and creates a LAG that includes the two or more connections to the managed switch 106 connected to the ports of the unmanaged switch 104 that received the LACP PDUs. The method 500 then starts 510 an LACP timer and returns to the idle state 502. If the method 500 determines 506 that the ports that received LACP PDUs are configured for LACP, the method 500 restarts 510 the LACP timer and returns to the idle state 502.

From the idle state 502 the method 500 also determines 512 if the LACP timer has expired. If the method 500 determines 512 that the LACP timer has not expired, the method 500 returns to the idle state 502. If the method 500 determines 512 that the LACP timer has expired, the method 500 clears 514 the LACP configuration of the ports in the LAG configured for LACP and returns to the idle state 502. In various embodiments, all or a portion of the method 500 is implemented with the PDU receiver module 302, the LACP configuration module 304, the LACP timer module 306 and/or the LACP clear module 308.

Figure 6:
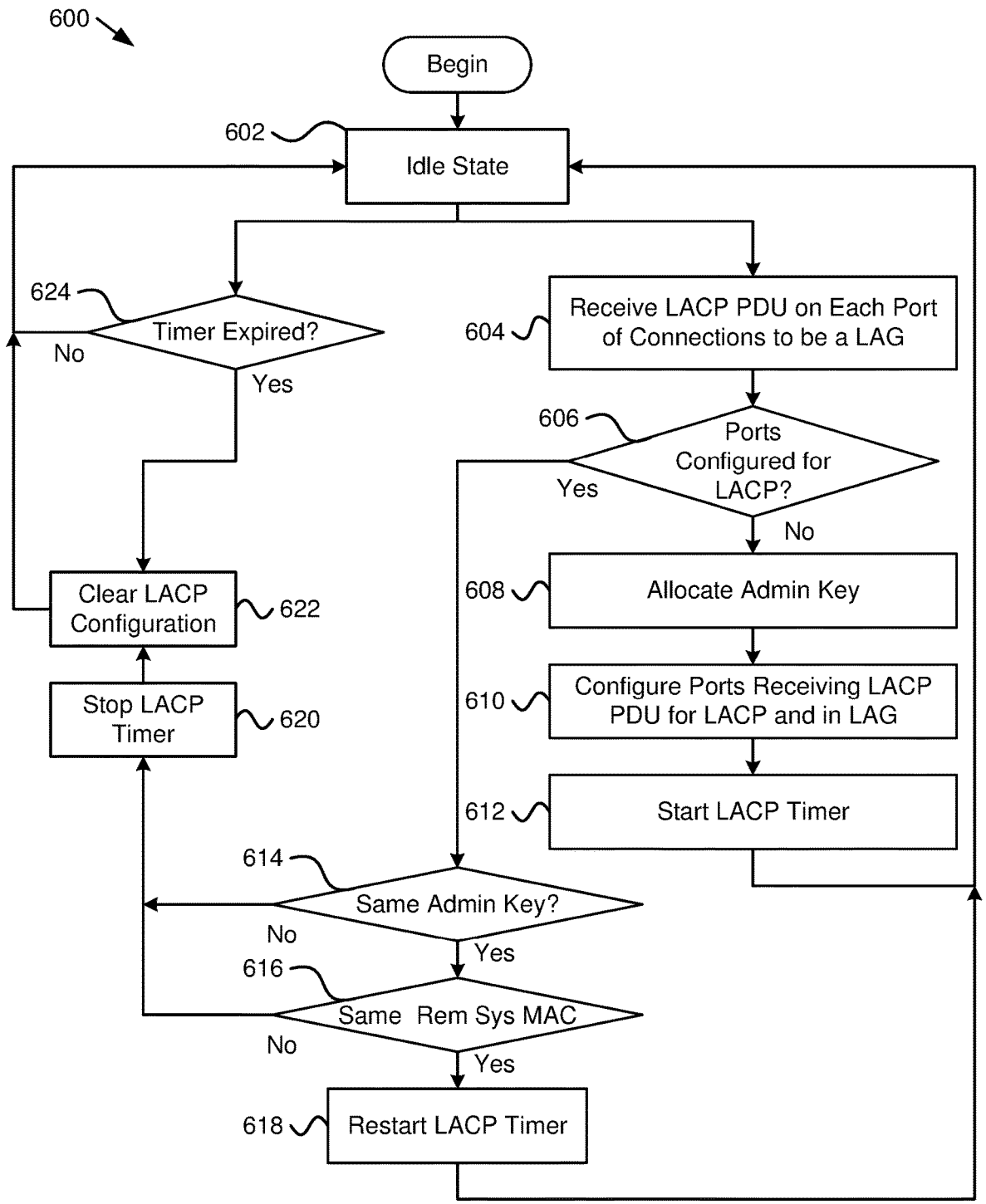
FIG. 6 is a schematic flow chart diagram illustrating another embodiment of a method for self-configuring link aggregation control protocol.

FIG. 6 is a schematic flow chart diagram illustrating another embodiment of a method 600 for self-configuring link aggregation control protocol. The method 600 runs on an unmanaged switch (e.g. 104) connected to a managed switch (e.g. 106) and begins in an idle state 602. From the idle state 602, the method 600 receives 604 an LACP PDU on each port of two or more connections to be linked in a LAG. The ports of the two or more connections are in the unmanaged switch 104 and are connected over the two or more connections to a managed switch 106. The method 600 determines 606 if the ports that received LACP PDUs are configured for LACP. If the method 600 determines 606 that the ports that received LACP PDUs are not configured for LACP, the method 600 allocates 608 an admin key and sends the admin key to the managed switch 106. The method 600 configures 610 each port receiving an LACP PDU for LACP and creates a LAG that includes the two or more connections to the managed switch 106 connected to the ports that received the LACP PDUs. The method 600 then starts 612 an LACP timer and returns to the idle state 602.

If the method 600 determines 606 that the ports that received LACP PDUs are already configured for LACP, the method 600 determines 614 if an admin key in received additional LACP PDUs matches the admin key allocated to the ports configured in the LAG. If the method 600 determines 614 that an admin key in received additional LACP PDUs does not match the admin key allocated to the ports configured in the LAG, the method 600 stops 620 the LACP timer and clears 622 the LACP configuration of the ports in the LAG configured for LACP and returns to the idle state 602.

If the method 600 determines 614 that an admin key in received additional LACP PDUs matches the admin key allocated to the ports configured in the LAG, the method 600 determines 616 if identification information in additional LACP PDUs received over the two or more connections configured in the LAG match identification information for the managed switch 106 (e.g. both have the same MAC address). If the method 600 determines 616 that identification information in additional LACP PDUs received over the two or more connections configured in the LAG does not match identification information for the managed switch 106, the method 600 stops 620 the LACP timer and clears 622 the LACP configuration of the ports in the LAG configured for LACP and returns to the idle state 602.

If the method 600 determines 614 that the admin key in received additional LACP PDUs matches the admin key allocated to the ports configured in the LAG and determines 616 that identification information in additional LACP PDUs received over the two or more connections configured in the LAG matches identification information for the managed switch 106, the method 600 restarts 618 the LACP timer and returns to the idle state 602.

From the idle state 602, the method 600 determines 624 if the LACP timer has expired. If the method 600 determines 624 that the LACP timer has expired, the method 600 clears 622 the LACP configuration of the ports in the LAG configured for LACP and returns to the idle state 602. Typically, expiration of the LACP timer indicates that LACP PDUs have not been received. If the method 600 determines 624 that the LACP timer has not expired, the method 600 returns to the idle state 602. In various embodiments, all or a portion of the method 600 is implemented with the PDU receiver module 302, the LACP configuration module 304, the LACP timer module 306, the LACP clear module 308, the ID module 402, the timer restart module 404, the admin key module 406, and/or the key match module 408.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
    receiving, at an unmanaged switch, an unsolicited link aggregation control protocol ("LACP") protocol data unit ("PDU") on each port of two or more connections to be linked in a link aggregation group ("LAG") from a managed switch, the ports of the two or more connections in the unmanaged switch, the unmanaged switch being unconfigured for LACP prior to receiving the unsolicited LACP PDU and connected over the two or more connections to the managed switch, wherein the managed switch is configured for LACP and is configured to transmit LACP PDUs to the unmanaged switch to initiate and maintain a LAG on the unmanaged switch;
    in response to determining that the ports that received an unsolicited LACP PDU are unconfigured for LACP:
        configuring, at the unmanaged switch, each port receiving an LACP PDU for LACP;
        creating, at the unmanaged switch, a LAG comprising the two or more connections to the managed switch connected to the ports that received the LACP PDUs; and
        starting, at the unmanaged switch, an LACP timer; and
    in response to determining that the LACP timer has expired, clearing, at the unmanaged switch, the LACP configuration of the ports configured for LACP, wherein the LACP timer expires in response to the ports in the LAG not receiving additional LACP PDUs prior to expiration of an LACP timer period,
    wherein a system administrator is unable to use LACP commands to manually configure ports for a LAG on the unmanaged switch.

2. The method of claim 1, wherein the received LACP PDUs include identification information for the managed switch and further comprising:
    in response to determining that the ports that received an LACP PDU are configured for LACP, determining if identification information in additional LACP PDUs received over the two or more connections configured in the LAG match identification information for the managed switch;
    in response to determining that the identification information in the received additional LACP PDUs matches identification information of the managed switch, restarting the LACP timer; and
    in response to determining that the identification information in the received additional LACP PDUs do not match identification information of the managed switch, stopping the LACP timer and clearing the LACP configuration of the ports configured for LACP.

3. The method of claim 2, further comprising:
    in response to determining that the ports that received an LACP PDU are unconfigured for LACP, allocating an admin key to the ports configured in the LAG and transmitting the admin key to the managed switch, wherein the managed switch transmits the admin key in additional LACP PDUs transmitted from the managed switch on the two or more connections of the LAG;
    in response to determining that an admin key in the received additional LACP PDUs does not match the admin key allocated to the ports configured in the LAG, stopping the LACP timer and clearing the LACP configuration of the ports configured for LACP; and
    in response determining that the identification information in the received additional LACP PDUs matches identification information of the managed switch and determining that an admin key in the received additional LACP PDUs matches the admin key allocated to the ports configured in the LAG, restarting the LACP timer.

4. The method of claim 1, wherein the LAG is a multi-chassis link aggregation group ("MLAG").

5. The method of claim 1, wherein the unmanaged switch comprises a connection to a baseboard management controller of each of two or more computing devices and the managed switch comprises a cloud controller.

6. The method of claim 1, wherein an organization controlling the managed switch lacks permission to configure ports of the unmanaged switch.

7. The method of claim 1, wherein the LACP timer period is greater than an interval that the managed switch transmits LACP PDUs to the ports on the unmanaged switch of the two or more connections to the managed switch.

8. An apparatus comprising:
    a controller of an unmanaged switch; and
    a memory storing code, the code being executable by the controller to perform operations comprising:
        receiving, at an unmanaged switch, an unsolicited link aggregation control protocol ("LACP") protocol data unit ("PDU") on each port of two or more connections to be linked in a link aggregation group ("LAG") from a managed switch, the ports of the two or more connections in the unmanaged switch, the unmanaged switch being unconfigured for LACP prior to receiving the unsolicited LACP PDU and connected over the two or more connections to the managed switch, wherein the managed switch is configured for LACP and is configured to transmit LACP PDUs to the unmanaged switch to initiate and maintain a LAG on the unmanaged switch;
        in response to determining, at the unmanaged switch, that the ports that received an unsolicited LACP PDU are unconfigured for LACP;

configuring each port receiving an LACP PDU for LACP;

creating a LAG comprising the two or more connections to the managed switch connected to the ports that received the LACP PDUs; and starting an LACP timer; and in response to determining, at the unmanaged switch, that the LACP timer has expired, clearing the LACP configuration of the ports configured for LACP, wherein the LACP timer expires in response to the ports in the LAG not receiving additional LACP PDUs prior to expiration of an LACP timer period, wherein a system administrator is unable to use LACP commands to manually configure ports for a LAG on the unmanaged switch.

9. The apparatus of claim 8, wherein the received LACP PDUs include identification information for the managed switch and the operations further comprising:

in response to determining that the ports that received an LACP PDU are configured for LACP, determining if identification information in additional LACP PDUs received over the two or more connections configured in the LAG match identification information for the managed switch;

in response to determining that the identification information in the received additional LACP PDUs match identification information of the managed switch, restarting the LACP timer; and in response to determining that the identification information in the received additional LACP PDUs do not match identification information of the managed switch, stopping the LACP timer and clearing the LACP configuration of the ports configured for LACP.

10. The apparatus of claim 9, the operations further comprising:

in response to determining that the ports that received an LACP PDU are unconfigured for LACP, allocating an admin key to the ports configured in the LAG and transmit the admin key to the managed switch, wherein the managed switch transmits the admin key in additional LACP PDUs transmitted from the managed switch on the two or more connections of the LAG; and in response to determining that an admin key in the received additional LACP PDUs does not match the admin key allocated to the ports configured in the LAG, stopping the LACP timer and clearing the LACP configuration of the ports configured for LACP.

11. The apparatus of claim 8, wherein the LAG is a multi-chassis link aggregation group ("MLAG").

12. The apparatus of claim 8, wherein the unmanaged switch comprises a connection to a baseboard management controller of each of two or more computing devices and the managed switch comprises a cloud controller.

13. The apparatus of claim 8, wherein an organization controlling the managed switch lacks permission to configure ports of the unmanaged switch.

14. The apparatus of claim 8, wherein the LACP timer period is greater than an interval that the managed switch transmits LACP PDUs to the ports on the unmanaged switch of the two or more connections to the managed switch.

15. A program product comprising a non-transitory computer readable storage medium storing program code, the program code configured to be executable by a processor of an unmanaged switch to perform operations comprising:

receiving, at an unmanaged switch, an unsolicited link aggregation control protocol ("LACP") protocol data unit ("PDU") on each port of two or more connections to be linked in a link aggregation group ("LAG") from a managed switch, the ports of the two or more connections in the unmanaged switch, the unmanaged switch being unconfigured for LACP prior to receiving the unsolicited LACP PDU and connected over the two or more connections to the managed switch, wherein the managed switch is configured for LACP and is configured to transmit LACP PDUs to the unmanaged switch to initiate and maintain a LAG on the unmanaged switch;

in response to determining, at the unmanaged switch, that the ports that received an unsolicited LACP PDU are unconfigured for LACP:

configuring each port receiving an LACP PDU for LACP;

creating a LAG comprising the two or more connections to the managed switch connected to the ports that received the LACP PDUs; and starting an LACP timer; and in response to determining, at the unmanaged switch, that the LACP timer has expired, clearing the LACP configuration of the ports configured for LACP, wherein the LACP timer expires in response to the ports in the LAG not receiving additional LACP PDUs prior to expiration of an LACP timer period, wherein a system administrator is unable to use LACP commands to manually configure ports for a LAG on the unmanaged switch.

16. The program product of claim 15, wherein the received LACP PDUs include identification information for the managed switch and the operations further comprising:

in response to determining that the ports that received an LACP PDU are configured for LACP, determining if identification information in additional LACP PDUs received over the two or more connections configured in the LAG match identification information for the managed switch;

in response to determining that the identification information in the received additional LACP PDUs match identification information of the managed switch, restarting the LACP timer; and in response to determining that the identification information in the received additional LACP PDUs do not match identification information of the managed switch stopping the LACP timer and clearing the LACP configuration of the ports configured for LACP.

17. The program product of claim 16, the operations further comprising:

in response to determining that the ports that received an LACP PDU are unconfigured for LACP, allocating an admin key to the ports configured in the LAG and transmitting the admin key to the managed switch, wherein the managed switch transmits the admin key in additional LACP PDUs transmitted from the managed switch on the two or more connections of the LAG; and in response to determining that an admin key in the received additional LACP PDUs does not match the admin key allocated to the ports configured in the LAG stopping the LACP timer and clearing the LACP configuration of the ports configured for LACP.

\* \* \* \* \*